United States Patent Office 3,484,681
Patented Dec. 16, 1969

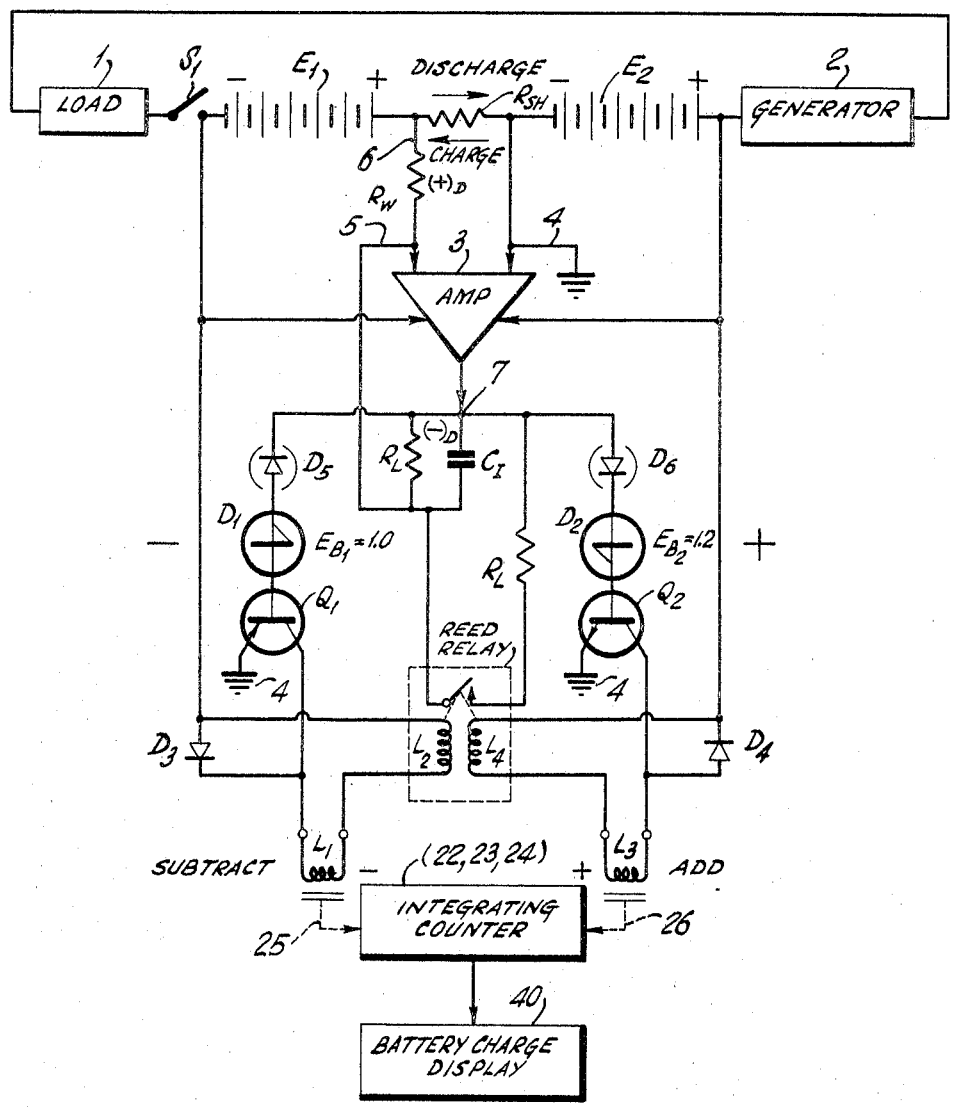

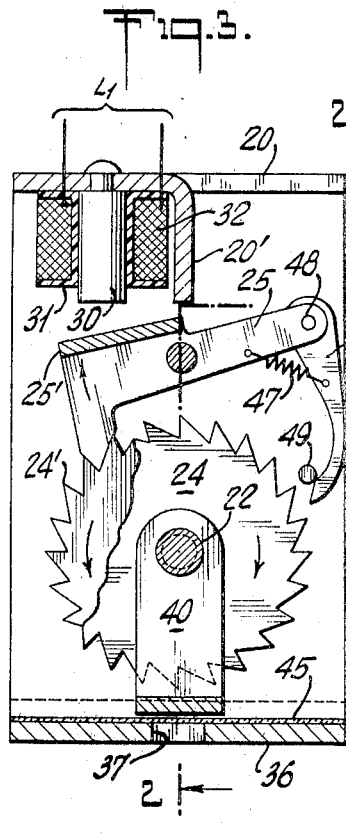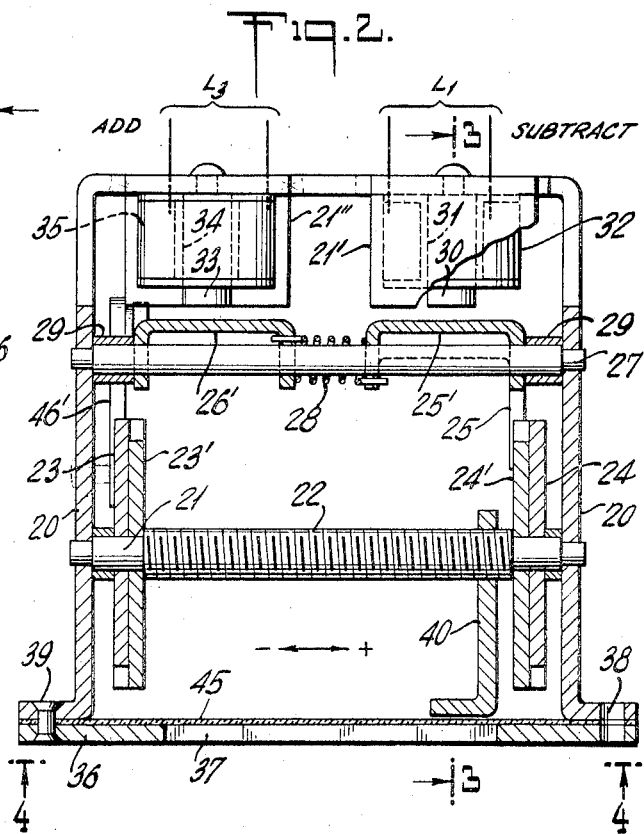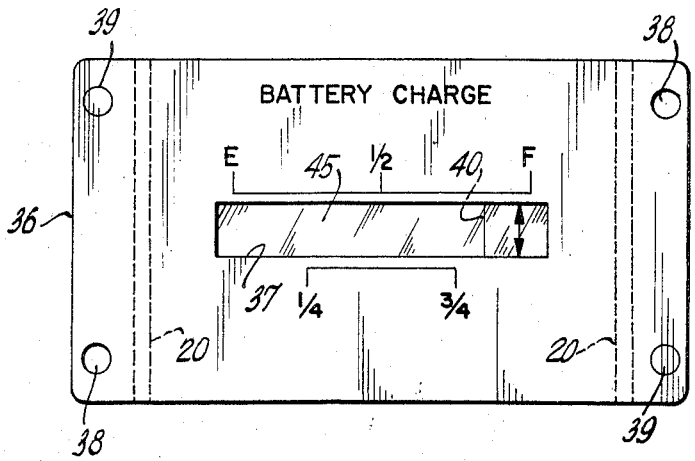

3,484,681
REMAINING BATTERY CHARGE METER
Charles B. Grady, Jr., 1 Ridgeway Ave., West Orange, N.J. 07052, and Nathaniel B. Wales, Jr., 48 Park Lane, Fair Haven, N.J. 07701
Filed Oct. 27, 1967, Ser. No. 678,660
Int. Cl. G01r *11/44, 1/00*
U.S. Cl. 324—29.5                                4 Claims

ABSTRACT OF THE DISCLOSURE

A storage battery charge meter for electric vehicles uses the bipolar voltage across a current sampling resistor as one input through a resistor to an integrating servo amplifier having capacitative feedback as the other input. Two oppositely polarized breakdown trigger devices monitor the accumulating capacitor voltage until reaching the avalanche potential of that device having the corresponding polarity. This unit charge or discharge signal is applied to the appropriate input of an electromechanical add-subtract counter. Each count resets the capacitor. By choosing different breakdown voltages or sensing ratios for the charge versus discharge devices, provision for battery efficiency is made, thereby displaying true remaining battery charge.

BACKGROUND OF THE INVENTION

Industrial electric trucks, and the like, using battery power, presently use direct current ampere-hour meters based on a mercury contacted homopolar motor drive which can develop enough mechanical torque from the few millivolts drop it can afford to dissipate, as to be able to drive a mechanically integrating gear train. Such instruments are bulky, expensive, delicate, and must be maintained within a small angle of the vertical.

With the increasing present interest in electric vehicles generated by improving batteries and increasing air pollution from internal combustion vehicles, and in view of the expanding market for electric golf carts and shopping vehicles, there is a need for a small, reliable, inexpensive, bidirectional ampere-hour type meter to signal the operator when the batteries need recharging, and to signal the charger when to stop. It would also be desirable for such a meter to correct for the loss of stored energy suffered by gas generation and other battery inefficiencies.

SUMMARY OF THE INVENTION

The present invention meets the foregoing needs by combining a short term electronic integrator with a long term electromechanical integrator in the form of a magnetic add-subtract counter which positions an analog display indicator or, in an alternative design, displays the integrated remaining battery charge in digital form.

The foregoing short term electronic integrator is in the form of a conventional closed servo loop in which the potential across a battery-current-sampling series resistor forms one input signal through a weighing resistor to a servo amplifier whose output charges an integrating capacitor with either possible electric polarity depending on the sign of the input bipolar voltage corresponding to charge or discharge of the battery. The potential accumulated by the foregoing capacitor forms a feedback signal which is electrically summed (algebraically) with the input current sampling signal to form an error signal input to the amplifier. Under these conventional servo system circumstances the capacitor will be charged positively or negatively in proportion to the battery charge or discharge rate, and the potential across the capacitor will represent the (short term) integrated battery charge or discharge in suitable units (such as ampere-hours).

If the foregoing system alone were to be used to integrate the total battery charge (say 200 ampere hours) over a period of days, it would require elaborate and expensive precautions to prevent temperature variations, varying battery voltages, and electrical leakage with varying humidity from destroying the accuracy of such an integrator. Further, it would require a very expensive, if not impossible, "infinite impedance" readout voltmeter to read the integrated capacitor voltage even to a reasonable accuracy.

The present invention circumvents these difficulties by providing two (preferably solid state) voltage breakdown or trigger devices, of opposite breakdown polarity which both simultaneously monitor the potential on the foregoing integrating capacitor. When this potential reaches the avalanche or trigger level of one or the other such device, it generates a pulse which signals on one of two output leads that one predetermined unit of either charge or discharge has been accumulated or lost by the battery.

The subject invention then teaches that this signal either directly or after amplification is impressed on the corresponding one of the two input modes of an electromechanical "add-subtract" counter used as a long-term integrating display.

In addition, means are provided by contacts on the counter, or by an auxiliary relay, to discharge the capacitor to a predetermined level, so as to prepare it for another short-term integrating cycle. In this way, an inexpensive and reliable battery charge meter is provided.

Another feature of the invention is to select a breakdown potential of the discharge signalling device which is smaller than that of the charge signalling device by a percentage corresponding to the efficiency of the battery as an energy storage device.

This differential treatment of charge and discharge units of integration thus provides the vehicle user with a true indication of the remaining battery energy instead of the misleading indication provided by a straight ampere-hour integrator which presumes 100% battery efficiency.

The principal object of this invention is to provide a novel design of battery charge meter which is rugged for vehicle use, accurate for industrial use, and economic to manufacture for sale to the golf cart and automotive volume markets.

Other objects are implicit in the accompanying specification and claims.

BRIEF DESCRIPTION OF THE DRAWINGS

FIGURE 1 is the schematic diagram of the preferred embodiment of the invention.

FIGURE 2 is a plan view through 2—2 of FIGURE 3 of the preferred form of the electromechanical bidirectional readout integrator of the invention.

FIGURE 3 is an end view through 3—3 of FIGURE 2.

FIGURE 4 is a front view through plane 4—4 of FIGURE 2.

DESCRIPTION OF THE PREFERRED EMBODIMENT

Referring to FIGURE 1, it may be seen that the two storage batteries $E_1$, $E_2$, a low resistance current sampling resistor $R_{sh}$, a load 1, and a generator 2 may all be connected in series by a switch $S_1$.

In automotive drives, and especially in energy conservative dynamic braking control systems (such as in copending U.S. patent application No. 642,117) it may be that the load 1 and the generator 2 are the same generator-motor device.

The potential appearing across series current sampling resistor $R_{sh}$ (typically, 50 millivolts for 200 ampere current) is impressed via lead 6 through a weighing resistor $R_w$ on the input terminal 5 of the high gain operational amplifier 3.

The output terminal 7 of amplifier 3 feeds current of either polarity to one side of the integrating capacitor $C_1$ whose other side is connected to summing point 5 of amplifier 3. Consequently, when the voltage at summing point 5 due to the rate of change of voltage (i.e., current into) capacitor $C_1$ is equal and opposite to the voltage at summing point 5 due to the current through weighing resistor $R_w$ (due to the battery charging current), then there is no error signal, and the capacitor $C_1$ will be charging with a polarity and current proportional to the battery current.

Due to the high gain of amplifier 3 (ideally infinite), any departure from this proportionality will produce an error signal at point 5 which will either increase or decrease the charging or discharging of capacitor $C_1$ until the analog proportionality is restored.

A shunt bleeder resistor $R_2$ across capacitor $C_1$ guarantees that a minimum threshold of charging or discharging activity must be present to prevent long term circuit leakages from introducing spurious integrating signals.

The build-up of voltage of either polarity in capacitor $C_1$ is simultaneously monitored by the two solid state voltage discharge or trigger devices $D_1$ and $D_2$. The corresponding redundant diodes $D_5$ and $D_6$ are illustrated in series relation only to clarify the polarities of discharge implied by the relatively recently adopted schematic symbols for these devices; that is, a bulid-up of negative potential on terminal 7 of capacitor $C_2$ will cause an avalanche of current through $D_1$ at say 10 volts ($=E_{B1}$) (it stands off very much greater positive potentials), whereas a build up of positive potential, $E_{B2}$ on terminal 7 of $C_1$ will cause breakdown of device $D_2$ at 12 volts (conversely, $B_2$ can stand off very much greater negative potentials).

When $D_1$ breaks down, it fires transistor $Q_1$ thereby energizing the series connected solenoid coils $L_1$ and $L_2$ from the negative terminal of Battery $E_1$. Similarly, when $D_2$ breaks down it fires transistors $Q_2$, thereby energizing the series connected solenoids $L_3$ and $L_4$ from the positive terminal of battery $E_2$. The diodes $D_3$ and $D_4$ are provided to protect the transistors in the system from the inductive voltage transients which may be generated by the collapse of magnetic fields in coils $L_1$, $L_2$, $L_3$, or $L_4$.

It may also be seen that amplifier 3 has a ground reference terminal 4, and is suitably connected to the negative terminal of battery $E_1$ and the positive terminal of battery $E_2$ for energization.

Coils $L_2$ and $L_4$ each can independently energize the single pole normally open contacts $S_2$ of the reed switch relay 8 so that each integrating breakdown signal generated by $D_1$ or $D_2$ will discharge the integrating capacitor $C_1$ through a limiting resistor $R_L$ to a predetermined potential (in this case, zero).

The output solenoids $L_1$ and $L_2$ are arranged to advance the add-subtract counting integrator 9 by one count in its subtract or add direction respectively, thereby accumulating the long term battery charge remaining.

The choice of $E_{B2}$ to have a breakdown potential value 20% greater than that of $E_{B1}$ is made on the presumption that the batteries $E_1$ and $E_2$ return only 80% of the electrical energy charged into them due to such inefficiencies as hydrogen gas generation or ohmic heat generation. Consequently, for equal charge and discharge currents, it will take 80% of the time necessary to produce a charge (add) integration pulse to produce a discharge (subtract) pulse. Other efficiencies would require corresponding ratios between the selection of $E_{B1}$ and $E_{B2}$.

It may also be seen that the circuitry and operating parameters of transistors $Q_1$ and $Q_2$ and their supply voltages each comprise a means of applying a predetermined proportion of the potential of capacitor $C_1$ across the corresponding trigger device $D_1$ and $D_2$ respectively. Consequently, if the foregoing proportion are $P_1$ and $P_2$ respectively and the breakdown voltages are $E_{B1}$ and $E_{B2}$ then the battery efficiency should equal $E_{B1}/E_{B2} \times P_2/P_1$ because in the drawings subscript 1 is associated with subtraction and subscript 2 is associated with addition. In the claims, however, "first means" are associated with addition and "second means" are associated with subtraction, in which case the product of ratio $E_{B2}/E_{B1}$ by the ratio $P_1/P_2$ should equal the battery efficiency.

Referring now to the specific preferred form of the electromechanical integrating charge register 9 shown in FIGURES 2, 3, and 4, it may be seen that this panel-mounting device comprises a bent sheet metal magnetically permeable frame 20 which is secured to a panel plate 36 by diagonal rivets 39.

A slot 37 in plate 36 together with a transparent plastic sheeet 45, sandwiched between frame 20 and plate 36, form a readout window for the device. Diagonal panel mounting holes 38 pierce all the parts 20, 45, and 36.

The drive coils 32 and 35 ($L_1$ and $L_3$ of FIGURE 1, respectively) have bobbins 31 and 34, and magnetic pole studs 30 and 33 respectively, each forming a concentric electromagnet structure. Poles 30 and 33 are riveted to the inside back of frame 20 in diagonal relation. A flap 21' integral with frame 20 is folded down to form a return magnetic path for coil 32 ($L_1$) while a second flap 21'', also integral with frame 20, is folded up to form a magnetic return path for coil 35 ($L_3$).

The subtract coil 32 ($L_1$) is provided with a magnetically permeable armature 25', which is an integral part of a bail member 25 and which in turn is pivotally mounted on shouldered shaft 27. Shaft 27 is supported by and entrapped between the side walls of frame so parallel to front plate 36.

A shouldered shaft 21 having a central threaded portion 22 is journalled and also entrapped between the side walls of frame 20 parallel to shaft 27. A pair of oppositely directed adjacent ratchet wheels 24 and 24' are mounted near one end of shaft 21, while a complementary pair of such adjacent ratchet wheels 23 and 23' are similarly secured to and mounted on the opposite end of shaft 21.

Bail 25 with its integral armature 25' is provided with an integral pawl finger which may engage the teeth of ratchet wheel 24' so as to form a holding pawl for "adding" input pulses to coil 35 ($L_3$). Bail 25 also has a drive lever portion on which a drive pawl 46 is pivotally mounted by means of stud 48. A helical extension spring 47 extending between and engaging holes in bail 25 and drive pawl 46 is provided to urge pawl 46 towards the teeth of ratchet wheel 24. In the position of bail 25 in which its holding pawl is engaging the teeth of ratchet wheel 24', a cam surface on drive pawl 46 engages a stud 49 secured to the adjacent wall of frame 20, so as to overcome spring 47 and to cam drive-pawl 46 out of engagement with the teeth of ratchet wheel 24, as shown in FIGURE 3.

The add coil 35 ($L_3$) and its magnetic parts 21'' and 33 are also provided with an armature 26' and an integral bail number 26 which is also pivotally mounted on the opposite end of shaft 27 in a mirror image relation. Bail 26 also has the mirror image counterpart of a holding finger pawl which can engage the teeth of ratchet wheel 23' to hold it during the subtractive pulsing of coil 32 ($L_1$). Bail 26 also has a drive arm portion on which a driving pawl 46' is mounted by stud 48' and biased by a spring 47' to bear on a frame stud 49', all in mirror image relation to the corresponding unprimed parts, so that while the energization of the subtract coil 32 ($L_1$)

will attract armature 25' to pole 30, and move drive pawl 46 off of stud 49 to engage and drive the teeth of ratchet wheel 24 in a clockwise rotation as seen in FIGURE 3, so, conversely, the energization of the add coil 35 ($L_3$) will attract its armature 26' to pole 33, and move drive pawl 46' off its stud 49' to engage and drive the teeth of ratchet wheel 23 in a counterclockwise rotation of shaft 21 as seen in FIGURE 3.

Bails 26 and 25 are spaced from the ends on shaft 27 by sleeves 29 and are spaced and torqued by the central coil torque spring 28 which surrounds shaft 27 and urges bails 26 and 25 in opposite directions of rotation about shaft 27 so that their holding pawl fingers engage ratchet wheels 23' and 24' respectively.

An indicator member 40 is internally threaded so as to form a nut at one end engaging the male threads 22 of shaft 21, and bent at right angles at the other end so as to carry an indicating mark or pointer which abuts plates 37 and 45 to prevent rotation about shaft 21, while being free for longitudinal motion along the axis of screw 22 for display of its indicating mark through window 37, 45. A scale on the face of plate 36 gives reference marks to visibly gauge the degree of battery charge remaining.

The operation of the system and device shown in the drawings is as follows:

It is presumed that there will be a time at which the storage batteries $E_1$ and $E_2$ will both be fully charged, and also, at this initial time it is presumed that the charge meter will have its read out indicator set to the "Full" reading. In the case of the preferred read out device of FIGURES 2, 3, and 4, this condition would correspond to the positioning of indicator 40 by the suitable rotation of screw 22 until the indicator mark on carrier 40 registered with the "F" mark adjacent to slot 37.

It will be evident to those skilled in the art that the screw 22 and nut 40 may be alternatively replaced as a readout means by a set of three or four digital (preferably decade) number wheels coupled by conventional Geneva type transfer pinions between each order, and having the lowest order wheel driven directly by the rotation of shaft 21.

In this case, the resulting digital read out might be calibrated directly in energy units of charge remaining, say, in watt hours, or, alternatively the number wheels could be calibrated in the decimal fraction of full charge remaining.

In the former choice of calibration, the initial full charge setting would be the numerical capacity of full battery charge, while in the latter choice of calibration, the dials could read 1.000.

On the closure of switch $S_1$ current will flow out of or into the storage batteries $E_1$ and $E_2$ depending on the usage and history of the load 1 and generator 2. The closed servo loop based on amplifier 3 will then form a short term integrator in which the voltage across capacitor $C_1$ will have a polarity and value proportional to the integral of current discharging or charging the battery from the closure of $S_1$.

When the level of voltage in $C_1$ reaches the breakdown potential of either avalanche device $D_1$ or $D_2$ it will fire $Q_1$ or $Q_2$ and register a subtract or an add count respectively to the long term electromechanical integrator 9.

The subtract pulse applied to coil $L_1$ will attract armature 23' towards pole 30 against the force of torque spring 28 thereby advancing ratchet wheel 24 one tooth in a direction tending to screw pointer 40 to the left as seen in FIGURE 4. This rotation of shaft 21 will cam the holding pawl finger of bail 26 outward from the edge of ratchet 23' against the torque of spring 28 until it drops into the next tooth. Consequently, at the end of the foregoing subtract pulse, pawl 46 will reverse and be cammed out of engagement with the teeth of ratchet 24 by the action of cam stud 49. During this withdrawal the holding action of bail 26 on the teeth of ratchet wheel 23' will prevent any rotation of shaft 21 which would otherwise occur in the absence of this holding action, due to the friction of pawl 46 on teeth 24 during withdrawal.

Conversely, an add pulse applied to coil $L_2$ will attract armature 26' to pole 33, thereby driving ratchet 23 by one tooth in a direction tending to screw indicator 40 to the right as seen in FIGURE 4. In this case, bail 25 acting on ratchet 24' acts as the holding pawl during the withdrawal of pawl 46' from teeth 23 at the end of the add pulse.

The same current which energizes either coil $L_1$ or $L_3$ is also made to pass through coil $L_2$ or $L_4$ respectively, and since both the latter surround reed switch $S_2$, the occurrence of either quantizing signal will thus discharge capacitor $C_1$ through current limiting resistor $R_L$ back to a zero potential, thereby starting a new cycle of differential quantization.

Evidently, this discharge could be also accomplished by providing two parallel normally open switches each actuated by the energization of one of the drive magnets $L_1$ or $L_3$.

What is claimed is:

1. A charge meter for storage batteries comprising:
    an electric sampling means to produce a bipolar potential proportional to the current flowing out of or into said batteries, and having a polarity depending on the direction of said flow;
    an integrating capacitor;
    electrical servo amplifier means for changing the potential of said capacitor at a rate proportional to the value of, and in a direction corresponding to the polarity of said bipolar sampling potential;
    a first potential-responsive electrical trigger device having a first polarity of breakdown and a first level of potential breakdown;
    a second potential-responsive electrical trigger device having a second polarity of breakdown opposite to said first polarity of breakdown, and a second level of potential breakdown;
    a first electric means to impress a first predeteremined proportion of the potential appearing across said integrating capacitor across said first trigger device;
    a second electric means to impress a second predetermined proportion of the potential appearing across said integrating capacitor across said second trigger device;
    a bidirectional counting device having an additive mode of energization by electrical pulses and a subtractive mode of energization by electrical pulses whereby to register the algebraic sum of such pulse counts;
    display means to signal the said algebraic sum;
    means responsive to the breakdown of said first potential responsive device to apply an electrical pulse to the said additive mode of said counting device; and
    means responsive to the breakdown of said second potential responsive device to apply an electrical pulse to the said subtractive mode of said counting device.

2. A device in accordance with claim 1 in which:
    the product of the ratio of said second level of potential breakdown to said first level of potential breakdown by the ratio of said first predetermined proportion to said second predetermined proportion is substantially equal to the fractional efficiency of said batteries as an energy storage device.

3. A device in accordance with claim 1 in which said bidirectional counting device and said display means comprises:
    a frame;
    a threaded shaft journalled in said frame;
    a linearly moveable indicator display member engaging the threads of said shaft and positionable by the rotation of said threaded shaft;
    a first electromagnetic means to advance said threaded shaft in a first direction of rotation for a unit angle in response to each pulse from said first pulse applying means; and a second electromagnetic means to advance said threaded shaft in a direction of rotation opposite to said first direction by a unit angle in response to each pulse from said second pulse applying means.

4. A device in accordance with claim 1 in which:
said display means comprises a plurality of digital counter wheel orders intercoupled by carry transfer means, and having its lowest order wheel driven by said bidirectional counting device.

References Cited

UNITED STATES PATENTS

| | | | |
|---|---|---|---|
| 2,547,324 | 4/1951 | Hurley | 324—111 X |
| 2,618,674 | 11/1952 | Stanton. | |
| 3,401,337 | 9/1968 | Beusman et al. | 324—29.5 X |

RUDOLPH V. ROLINEC, Primary Examiner

C. F. ROBERTS, Assistant Examiner

U.S. Cl. X.R.

320—48; 324—111